United States Patent [19]

Kimura

[11] 3,727,149

[45] Apr. 10, 1973

[54] BURST CONTROL CIRCUIT HAVING A VOLTAGE RESPONSIVE OSCILLATOR

[75] Inventor: Kenji Kimura, Tokyo, Japan

[73] Assignee: Shiba Electric Co. Ltd., Tokyo, Japan

[22] Filed: Aug. 25, 1971

[21] Appl. No.: 174,721

[30] Foreign Application Priority Data

Aug. 29, 1970 Japan ................................ 45/75445

[52] U.S. Cl. ............... 331/1 R, 178/69.5 CB, 331/20, 331/36 C, 331/165, 331/173, 331/177 V

[51] Int. Cl. ............................ H03b 3/04, H04n 9/46

[58] Field of Search ...................... 331/1 R, 20, 36 C, 331/172, 173; 178/5.4 SY, 69.5 CB

[56] References Cited

UNITED STATES PATENTS 2,744,155 5/1956 Kinn ............................ 178/69.5 CB 3,424,999 1/1969 Spies ............................ 331/172 X 3,415,949 12/1968 Williams ......................... 331/173 X 3,569,613 3/1971 Kresock .......................... 178/5.4 SY

*Primary Examiner*—Roy Lake

*Assistant Examiner*—Siegfried H. Grimm

*Attorney*—Chittick, Pfund, Birch, Samuels & Gauthier

[57] ABSTRACT

A burst control circuit for producing a continuous signal synchronized in phase with an intermittent burst signal and comprising a voltage-responsive control oscillator having a natural oscillation frequency, means for comparing the frequency the continous signal with the natural oscillation frequency of the control oscillator and means responsive to the output from the comparing means for producing an error signal and applying it to the oscillator to make equal the natural frequency of oscillation of the control oscillator with the continous signal.

6 Claims, 5 Drawing Figures

BY Chittick, Pfund, Birch, Samuels & Gauthier
ATTORNEY

BY Chittick, Pfund, Birch, Samuels & Gauthier
ATTORNEY

BY Chittick, Pfund, Birch
Samuels & Gauthier
ATTORNEY

BURST CONTROL CIRCUIT HAVING A VOLTAGE RESPONSIVE OSCILLATOR

BACKGROUND OF THE INVENTION

This invention relates to a burst control oscillator for producing a continuous signal synchronized in phase with an intermittent burst signal.

Many simplified processing systems for reproduced color video signals have been proposed for use in magnetic video reproducing devices including the double heterodyne system, the line-to-line system, and the electronic resolver system. Each one of these prior systems requires use of a color burst control oscillator for synchronizing the phase of the color burst signal separated from the reproduced video signal at each line and for obtaining a continuous burst signal. Video signals reproduced from a VTR are generally reproduced by means of a rotary head so that the phase of such reproduced signals varies greatly. Although the operation of a quartz oscillator is extremely stable it can not follow-up the phase variation of such reproduced signals accompanying a large phase variation very well. For this reason, it is the common practice to use an oscillator comprising a capacitor and an inductor. However, the oscillation frequency of such an oscillator is unstable because of the variation in the constants of the component parts caused by the variation in the ambient temperature and aging.

SUMMARY OF THE INVENTION

It is therefore an object of the invention to provide an improved burst control oscillator having at least the same follow-up characteristic to the phase variation of the reproduced signal as the prior oscillator comprising a capacitor and an inductor and having the same degree of frequency stability as that of a crystal oscillator.

According to this invention, there is provided a burst control circuit for producing a continuous signal synchronized in phase with an intermittent burst signal, said circuit comprising a voltage-responsive control oscillator having a natural oscillation frequency, means for comparing the frequency of said continuous signal with the natural oscillation frequency of the control oscillator and means responsive to the output from the comparing means for producing an error signal and applying said signal to said oscillator to make equal the natural frequency oscillation of the control oscillator with said continuous signal whereby to maintain the natural frequency of oscillation of the control oscillator at the value of said continuous signal.

BRIEF DESCRIPTION OF THE DRAWINGS

The invention can be more fully understood from the following detailed description taken in conjunction with the accompanying drawings in which.

DESCRIPTION OF THE PREFERRED EMBODIMENT

Figure 3:
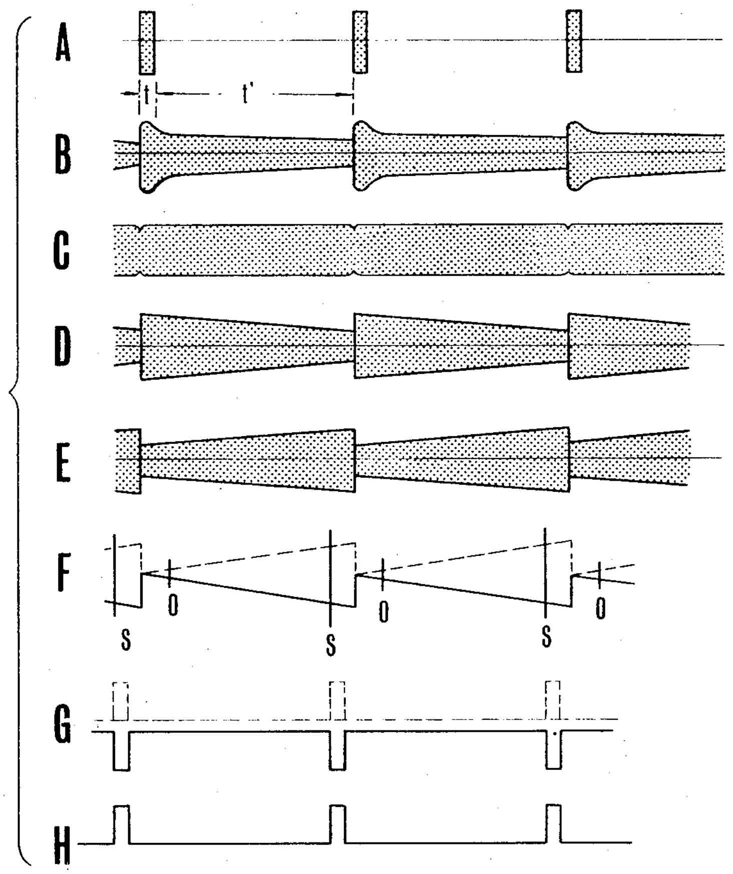
FIG. 3 shows waveforms to explain the operation of the embodiment shown in FIG. 2.

In order to have a better understanding of the invention a typical prior art burst control oscillator will first the described with reference to FIG. 1 of the accompanying drawing. The oscillator shown therein comprises a resonance circuit including capacitors 2 and 5, an inductor 4, a resistor 3 and a variable capacitance or varactor diode 6 which are connected as shown. The resonance frequency of the resonance circuit is determined to be substantially equal to the frequency of the reproduced burst signal 1. The varactor diode 6 varies its capacitance in accordance with the voltage applied thereacross, that is the resonance frequency control voltage 8 for the purpose to be described later. The waveform of the continuous burst signal generated by the resonance circuit is shown by FIG. 3B. As shown by FIG. 3A, the reproduced burst signal is an intermittent signal. The continuous burst signal B is formed by utilizing the intermittent signal as a reference signal. The burst control oscillator is triggered intermittently by the reproduced burst signal as at t shown in FIG. 3B. During the period in which there is no reproduced burst signal, the burst signal generated by the burst control oscillator attenuates as shown by t' in FIG. 3B.

The resonance frequency of the resonance circuit of the burst control oscillator is forced to be synchronous with the frequency of the reproduced burst signal when the oscillator is triggered and once the burst control oscillator has been triggered the frequency thereof asymptotes the natural resonance frequency $f_0$ of the resonance circuit during the period t' shown in FIG. 3B. Where there is a difference between the natural resonance frequency $f_0$ and the frequency $f_B$ of the reproduced burst signal, the quality of the color picture reproduced by the color processing is greatly impaired. For this reason, the burst control oscillator is required to have an extremely high stability. However, it has been extremely difficult to design a color burst control oscillator having an excellent stability because with the prior art burst control oscillator the oscillation frequency thereof is greatly influenced by the variation of the constants of the capacitor and inductor constituting its resonance circuit caused by the variation in the ambient temperature and aging. In the prior art burst control oscillator of the type shown in FIG. 1, the oscillation control voltage B is varied manually so as to minimize the difference between frequencies $f_B$ and $f_0$.

The invention contemplates elimination of such manual adjustment of the oscillation frequency by increasing the stability of natural resonance frequency $f_0$ of the resonance circuit of the burst control oscillator to that of a quartz or crystal oscillator.

Figures 1, 2:
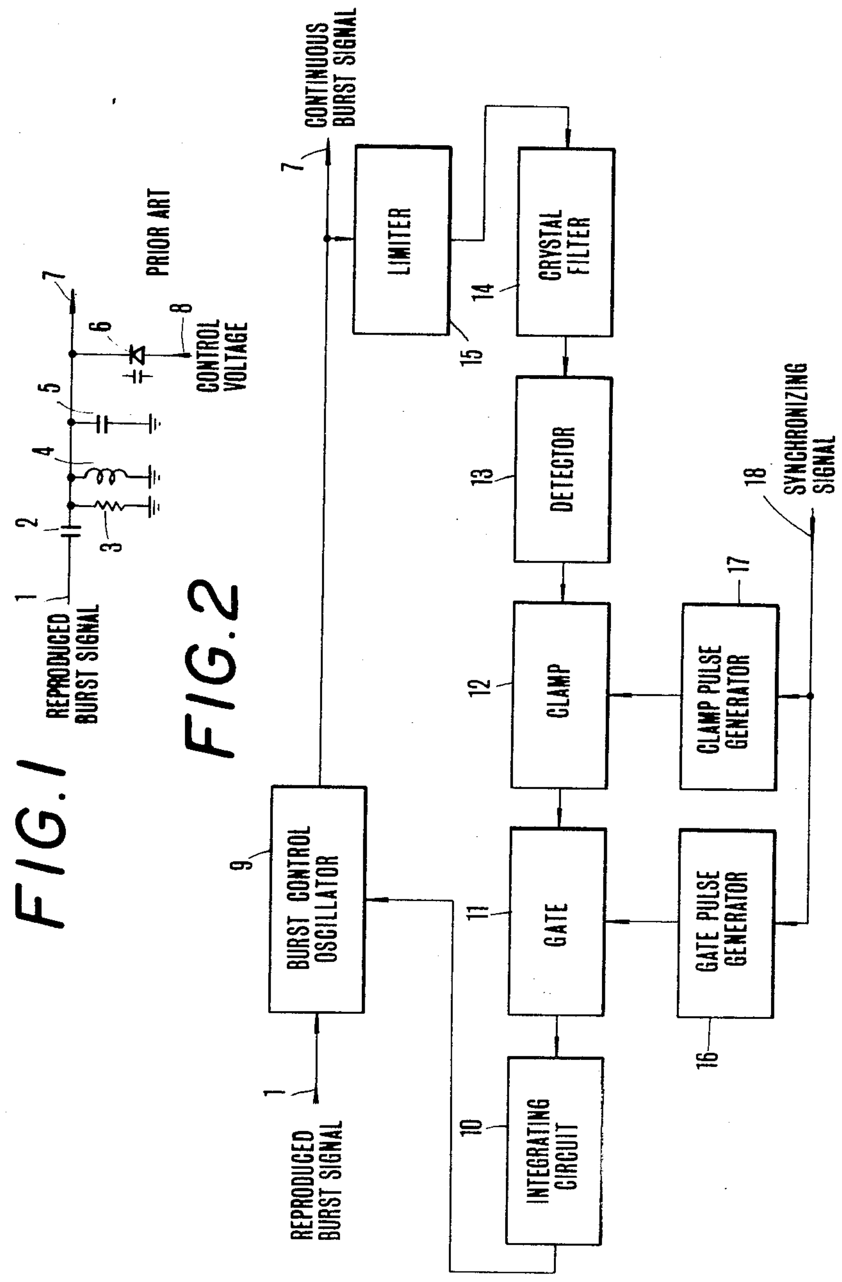
FIG. 1 is a connection diagram of a prior art burst control oscillator.
FIG. 2 is a block diagram illustrating one embodiment of the invention.

Turning now to FIG. 2 which shows a block diagram of the novel burst control oscillator, reproduced burst signal 1 is applied to a burst control oscillator 9 to trigger and oscillate the same for generating a continuous burst signal 7. The oscillator 9 has a construction shown in FIG. 1. The continuous burst signal 7 is applied to a limiter circuit 15 to make constant its amplitude. The output from limiter circuit 15 is applied to a quartz or crystal filter 14. The natural frequency of vibration $f_x$ of the crystal utilized in filter 14 is set to be slightly lower than the frequency (ordinarily 3,579,545 ± 10 $H_z$) of the reproduced burst signal 1. FIGS. 3C,3D and 3E show the waveforms of the crystal filter. When the frequency $f_O$ is higher than that of the reproduced burst signal the waveform takes the form of an envelope as shown in FIG. 3D whereas when frequency $f_O$ is lower than that of the reproduced burst signal the waveform takes the form shown in FIG. 3E. FIG. 3C shows a condition where frequency $f_O$ is equal to the frequency of the reproduced burst signal. The output signal from crystal filter 14 is subjected to an envelope detection in a detector 13 and the output thereof is clamped by a clamping circuit 12. Video signals reproduced from a magnetic video reproducing device usually contain a large quantity of phase jitter which acts upon the output waveform from the crystal filter 14 to cause amplitude fluctuation. Since the frequency component of the jitter is generally sufficiently lower than the recurring frequency (ordinarily 15.75 $KH_z$) of the reproduced signal it is possible to minimize its adverse effect by clamping it near point O in FIG. 3F which shows the output waveform of detector 13. The clamp pulse is generated by a clamp pulse generator 17 which is triggered by a reproduced synchronizing signal 18 isolated from the reproduced video signal. While the burst control oscillator 9 is triggered at a point S shown in FIG. 3F as the output from detector 13 is clamped at point O the output from detector 13 will be represented by the solid lines shown in FIG. 3F when the frequency $f_O$ of the output signal from burst control oscillator 9 is higher than the frequency $f_B$ of the reproduced burst signal whereas by dotted lines when $f_O$ is lower than $f_B$. The output from clamping circuit 12 is gated by a gate circuit 11 to provide a pulse as shown by FIG. 3G. Where $f_O$ is higher than $f_B$ a negative pulse is generated whereas a positive pulse where $f_O$ is lower than $f_B$. The gate pulse having a waveform shown in FIG. 3H is generated by a gate pulse generator 16 which is triggered by the reproduced synchronizing signal like the clamping pulse generator 17.

Figure 4:
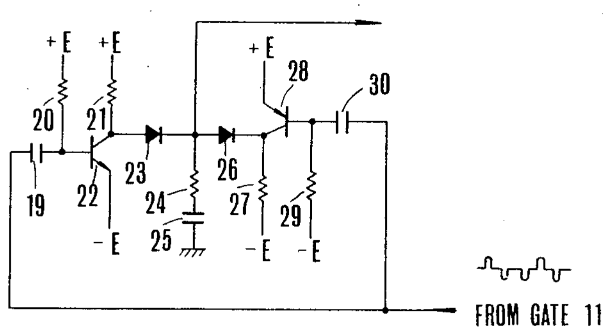
FIG. 4 shows a connection diagram of an integrating circuit utilized in this invention and FIG. 5 is a characteristic curve showing the relationship between the oscillation frequency of the burst control oscillator and the control voltage.

The output from the gate circuit 11 is coupled to an integrating circuit. FIG. 4 shows a connection diagram of one example of the integrating circuit. As shown the circuit comprises a capacitor 25 charged and discharged by a pair of switching transistors 22 and 28. More particularly, these transistors are maintained normally ON. When the frequency $f_O$ is higher than frequency $f_B$, the output pulse from gate circuit 11 is negative as above described and this negative pulse is applied to these transistors through coupling capacitors 19 and 30, respectively. Thus, transistor 28 continues its ON state whereas transistor 22 is rendered OFF while the pulse is being applied to the base electrode thereof. When transistor 22 becomes OFF, capacitor 25 is charged from a source of supply represented by a symbol +E through resistors 21 and 24 and a diode 24. On the other hand, when $f_O$ is lower than $f_B$, the positive pulse generated by gate circuit 11 renders ON the transistor 22 but renders OFF transistor 28. Under these conditions capacitor 25 is charged in the negative direction from a negative source −E through resistors 27 and 24 and a diode 26. Consequently, the terminal voltage of capacitor 25 is a DC signal voltage which varies towards positive where $f_O$ is higher than $f_B$ whereas towards negative when $f_O$ is lower than $f_B$.

Figure 5:
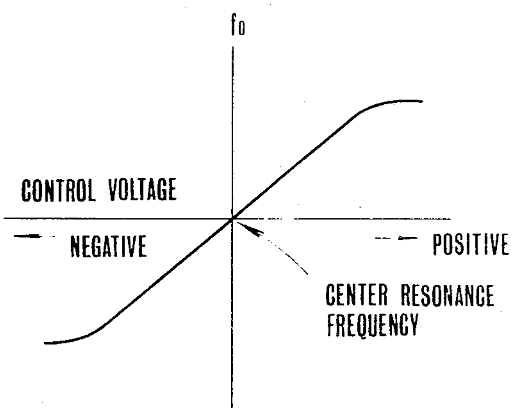

This DC voltage across capacitor 25 is applied to the varactor diode 6 shown in FIG. 1 to act as the control voltage for varying the frequency $f_O$ of the natural resonance frequency of the resonance circuit. FIG. 5 is a graph showing the relationship between natural resonance frequency $f_O$ of the resonance circuit and the control voltage provided by the integrating circuit. As can be noted from FIG. 5, the control voltage is negatively fed back so that $f_O$ is always equal to $f_B$. The purpose of integrating circuit 10 is to control frequency $f_O$ and to memorize the voltage applied across the varactor diode 6 which is necessary to equalize frequencies $f_O$ and $f_B$. The stored voltage is preserved unless frequency $f_O$ is caused to vary by some external factors. Where frequency $f_x$ is slightly higher than frequency $f_B$ the polarities of the waveforms shown in FIGS. 3D and 3E are reversed, but the above described function can be assured by reversing the polarity of varactor diode 6 (FIG. 1) or of control voltage so that the control voltage will always be fed back negatively to the burst control oscillator.

Although the invention has been shown and described in terms of a preferred embodiment thereof, it will be understood that many changes and modifications may be made within the true spirit and scope of the invention as defined in the appended claims.

What is claimed is:

1. In combination, a burst control oscillator having a resonance circuit and connected to be triggered by a reproduced burst signal for producing a continuous burst signal, a limiter responsive to said continuous burst signal for producing a signal of constant amplitude, a filter connected to the output of said limiter, an envelope detector connected to the output of said filter, a clamping circuit for clamping the output of said detector, a gate circuit for gating the output from said clamping circuit and an integrating circuit responsive to the polarity of the output from said gate circuit for producing a control voltage for varying the frequency of natural resonance of the resonance circuit of said burst control oscillator.

2. The combination according to claim 1 wherein said filter includes a crystal having a natural frequency of vibration slightly lower than the frequency of said reproduced burst signal.

3. The combination according to claim 1 wherein said clamping circuit is controlled by a clamp pulse generated by a clamp pulse generator which is triggered by a reproduced synchronizing signal isolated from a reproduced video signal.

4. The combination according to claim 1 wherein said gate circuit is controlled by a gate pulse generated by a gate pulse generator which is triggered by a reproduced synchronizing signal isolated from a reproduced video signal.

5. The combination according to claim 1 wherein said integrating circuit comprises a memory capacitor and a pair of switching transistors connected to charge and discharge said memory capacitor in response to the polarity of the pulse gated through said gate circuit for producing said control voltage.

6. The combination according to claim 1 wherein said burst control oscillator comprises a resonance circuit including a capacitor and an inductor, and a voltage responsive variable capacitance diode for controlling the frequency of natural resonance of said resonance circuit and wherein said control voltage produced by said integrating circuit is applied across said voltage responsive variable capacitance diode.

* * * * *